United States Patent [19]
Chor et al.

[11] Patent Number: 6,141,003
[45] Date of Patent: Oct. 31, 2000

[54] CHANNEL BAR USER INTERFACE FOR AN ENTERTAINMENT SYSTEM

[75] Inventors: Ives Chor, Seattle; Seung-Yup Chai, Redmond; John Hawkins, Duvall, all of Wash.

[73] Assignee: Microsoft Corporation, Redmond, Wash.

[21] Appl. No.: 08/820,710

[22] Filed: Mar. 18, 1997

[51] Int. Cl.[7] .................................................. H04N 7/10
[52] U.S. Cl. ........................................ 345/327; 709/219
[58] Field of Search .................................. 345/327, 328; 455/4.2; 348/7, 12, 906, 569, 10, 563; 380/10; 395/200.47, 200.48; 709/217–219

[56] References Cited

U.S. PATENT DOCUMENTS

| | | |
|---|---|---|
| 5,416,535 | 5/1995 | Sato et al. . |
| 5,532,753 | 7/1996 | Buchner et al. ........................ 348/569 |
| 5,589,893 | 12/1996 | Gaughan et al. . |
| 5,727,060 | 3/1998 | Young ...................................... 380/10 |
| 5,812,123 | 9/1998 | Rowe et al. ............................. 345/327 |
| 5,889,950 | 3/1999 | Kuzma .............................. 395/200.48 |
| 5,929,849 | 7/1999 | Kikinis ..................................... 348/10 |
| 5,940,073 | 8/1999 | Klosterman et al. .................... 345/327 |
| 5,959,688 | 9/1999 | Schein et al. ............................ 348/906 |
| 6,025,837 | 2/2000 | Matthews, III et al. ................ 345/327 |

FOREIGN PATENT DOCUMENTS

| | | |
|---|---|---|
| 0 560 593 A2 | 10/1993 | European Pat. Off. . |
| 0 721 253 A2 | 3/1996 | European Pat. Off. . |
| 0 721 253 A2 | 10/1996 | European Pat. Off. ........... H03J 1/04 |
| 0 834 798 A2 | 10/1997 | European Pat. Off. ........ G06F 3/033 |
| WO 98/26584 | 6/1998 | WIPO . |

*Primary Examiner*—Victor R. Kostak
*Attorney, Agent, or Firm*—Lee & Hayes, PLLC

[57] ABSTRACT

A graphical user interface for an entertainment system assists a viewer while navigating channels. The user interface is a channel bar which is displayed together with the currently selected channel. The channel bar has a plurality of linearly arranged channel-related icons for navigating the channels. A viewer-controllable focus is movable along the channel bar to permit the viewer to select and actuate any one of the icons, causing the entertainment system to jump to the channel associated with the selected icon. The entertainment system is a computerized viewing unit which has a processor, memory, and a multitasking operating system that provides a graphical user interface environment which supports presentation of graphical windows. An application executes on the processor to provide the channel bar user interface. An input device—such as a mouse, keyboard, remote control handset, etc.—enables the viewer to invoke the channel bar and to manipulate the focus along the channel bar. The channel bar UI includes a banner which contains information pertaining to the presently selected channel and a recent channels bar which contains linearly-arranged actuatable icons that are associated with channels that have been most recently selected by the viewer. The channel bar UI also includes a favorite channels bar having actuatable icons for channels most preferred by the viewer and a tools bar having actuatable icons that are associated with control features for operating the entertainment system. The tools bar has an icon which permits a viewer to toggle between a television mode, in which programs are displayed full screen, and a windows mode in which the program and channel bar are confined to a window.

41 Claims, 7 Drawing Sheets

CHANNEL BAR USER INTERFACE FOR AN ENTERTAINMENT SYSTEM

TECHNICAL FIELD

This invention relates to entertainment systems in which video programs, such as television shows, are provided over channels. More particularly, this invention relates to a computer-like user interface which assists a viewer in navigating among various channels.

BACKGROUND OF THE INVENTION

Conventional televisions offer very little assistance to a viewer who is navigating among many channels in an effort to locate a desired program or station. The television or cable set top box displays a channel number, but this is often the only information provided to the viewer. Some newer models might also display a network name or logo along with the channel number. Unfortunately, this user interface, although customary, is not particularly useful. Most viewers resort to memorizing their favorite channel numbers and skipping about to these favorite channels.

Memorizing favorite channels is effective when the channel offerings are few and the viewer is accustomed to a single regional television market. However, the number of channels available for viewing on cable or satellite television networks is expected to increase dramatically, with 500 or 1000 channels being commonplace. Today, a viewer may have no difficulty memorizing that the ESPN® Sports Network resides in his/her market on channel 29; but tomorrow, the same viewer might have trouble memorizing that ESPN 1 is on channel 292, ESPN 2 is on channel 564, and ESPN 3 is on channel 1008. Additionally, memorization does little to help the traveling viewer who finds himself or herself in a new market with entirely different channel number and network affiliations.

Figure 1:
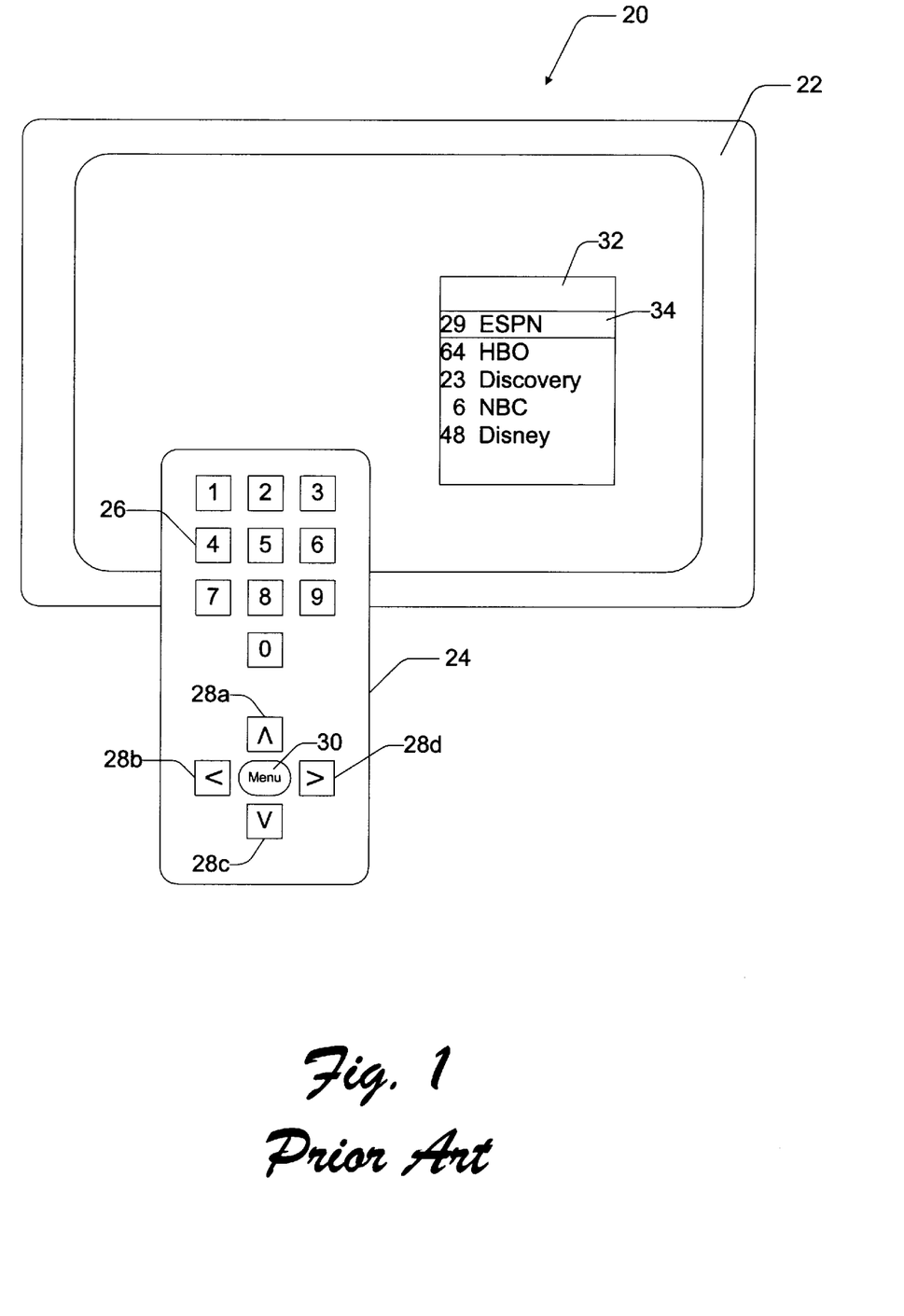
FIG. 1 is a diagrammatic illustration of a prior art television system which utilizes a pop-up menu to present a predetermined list of favorite channels to assist a viewer in choosing a possible channel for viewing.

There is a need to improve television user interfaces to better assist viewers when selecting channels. Some progress has been made. Sony Corporation has developed one type of user interface which offers some viewer assistance in selecting favorite channels. FIG. 1 shows a Sony television system 20 having a television 22 and a remote control handset 24. In this example illustration, the handset 24 has a 10-digit numeric keypad 26, a four directional control buttons 28a–28d, and a menu button 30 centrally located in the directional control buttons 28. Other control buttons might also be included on the handset 24—such as power, volume, VCR shuttle controls, mute, etc.—but are not shown in this illustration.

The Sony system 20 provides a user interface in the form of a pop-up menu 32 which appears on the television 22 when the viewer depresses the menu button 30. The pop-up menu 32 lists five favorite channels of the viewer. A highlight bar 34 is initially positioned on the top choice, but can be scrolled over the favorites list using the up/down buttons 28a and 28c. The favorites list is user-configurable, allowing the viewer to define which channels are displayed in the pop-up menu 32. With this user interface, a viewer can quickly display his/her top five favorite channels and select the one most appealing at that moment. The user interface alleviates the problem of having to memorize favorite channels.

The inventors have developed a new user interface system for assisting a viewer in channel navigation, as well as other control features.

SUMMARY OF THE INVENTION

This invention concerns a graphical user interface for an entertainment system which assists a viewer while navigating channels. The user interface is a channel bar which is displayed together with the currently selected channel. The channel bar has a plurality of linearly arranged channel-related icons for navigating the channels. A viewer-controllable focus is movable along the channel bar to permit the viewer to select and actuate any one of the icons, causing the entertainment system to jump to the channel associated with the selected icon.

According to one implementation, the entertainment system is a computerized viewing unit which has a processor, memory, and a multitasking operating system. The operating system provides a graphical user interface environment which supports presentation of graphical windows. An application executes on the processor to provide the channel bar user interface (UI). When used in conjunction with television programming, the application sizes the channel bar UI to ensure that it resides in the video safe zone. An input device—such as a mouse, keyboard, remote control handset, etc.—enables the viewer to invoke the channel bar UI and to manipulate the focus along the channel bar.

The channel bar UI includes a banner which contains information pertaining to the presently selected channel. The banner might include, for example, the following information: a channel number, station call letters, a network logo, the name of the program that is presently being played, the program time slot, whether the program is data enhanced, whether the program is in stereo, or whether the program has closed captioning or alternate audio tracks. The banner is displayed by itself, in a corner of the display, when the viewer is channel surfing using channel up/channel down controls on an input device.

The channel bar also includes three control bars which are invokable by the viewer by activation of a special button on the remote control, or by utilization of the mouse or keyboard, or by a similar operation. The three control bars are displayed with the banner to present the full channel bar UI. The control bars include a recent channels bar, a favorite channels bar, and a tools bar. The recent channels bar contains linearly-arranged actuatable icons which are associated with channels that have been most recently selected by the viewer. For instance, the recent channels bar shows icons for the three most recently selected channels which are unique (i.e., no one channel is shown twice in the list). Each icon might consist of a network logo, a program logo, a channel number, station call letters, a network name, or a combination of these.

The favorite channels bar contains actuatable icons that are associated with those channels most preferred by the viewer. This list of favorites can be viewer configurable, or automatically tabulated based on viewer behavior patterns or other heuristics.

The tools bar contains actuatable icons that are associated with control features for operating the entertainment system. For example, the tools bar might contain an icon for facilitating viewer log on, an icon for turning off the entertainment system, and an icon for launching a find dialog box to help the viewer find a particular program or channel. The tools bar also has an icon which permits a viewer to toggle between a television mode, in which programs are displayed full screen, and a windows mode in which the program and channel bar are confined to a window. The windowed program and channel bar can then be controlled by the viewer using conventional windowing controls, such as minimizing the window, re-sizing it, moving it, and so forth. Once in the windows mode, the viewer can launch other applications, such as an e-mail application, or an Internet Web browser, or a conventional computer application (word processing, spreadsheet, financial/banking, etc.), or the like.

According to another aspect of this invention, the icons on the channel bar are associated with both channels used to receive traditional television programming (movies, shows, sports, news, etc.) and channels used to access Web sites or other target specifications on the Internet. The channel bar can also be constructed to contain hyperlinks, independent of any associated channel, which allow the user to activate associated target specifications directly from the channel bar.

DETAILED DESCRIPTION OF THE PREFERRED EMBODIMENT

Figure 2:
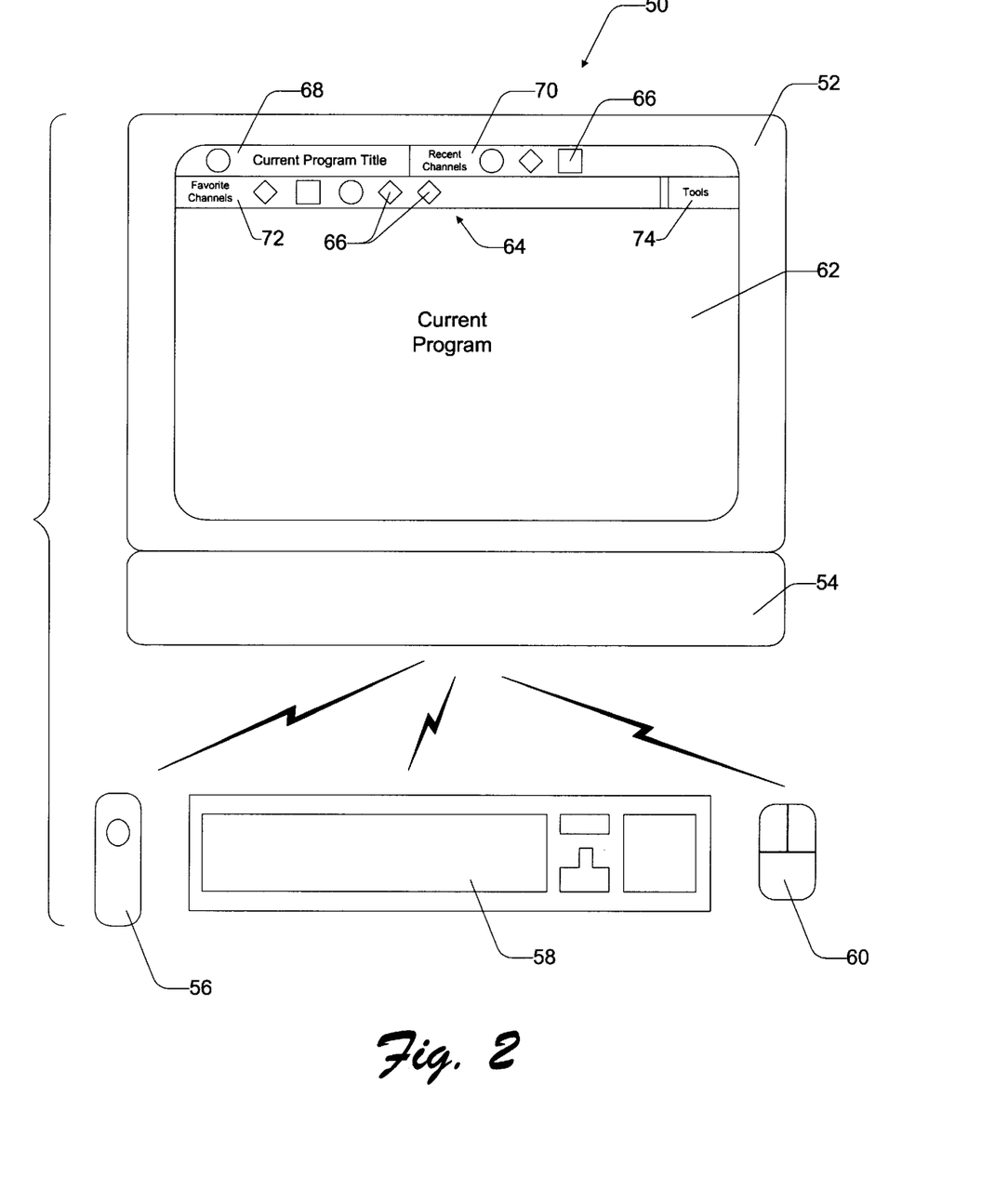
FIG. 2 is a diagrammatic illustration of a viewer computing unit according to one implementation of this invention.

FIG. 2 shows a viewer computing unit 50 constructed according to one implementation of this invention. The viewer computing unit 50 is embodied as a broadcast-enabled personal computer (PC) having tuner equipment installed therein to receive the video data, such as conventional television broadcast signals. The viewer computing unit 50 includes a display 52, a central processing unit (CPU) 54 (which is shown separately, but may be incorporated into the display casing), and various input devices such as a remote control handset 56, a remote keyboard 58, and a remote mouse 60. Each of the input devices are coupled to the CPU 54 via a wireless data link, such as an IR (infrared) link or an RF (radio frequency) link; although the keyboard and mouse can be coupled using traditional serial cables.

The broadcast-enabled PC is only one example implementation, and many are possible. One alternative implementation is a computer-enhanced television set having a processor, memory, and an operating system. Another implementation might be a television with a built in Web browser for Internet access, commonly referred to as a "Web television" or "Internet television." Another implementation might be a television with a set-top box (STB).

The viewer computing unit 50 shows a conventional video program 62 on the display 52 in the same or similar manner as conventional television. The video program 62 can be a TV show, a movie, news, sports, or other video program. Signals received from an antenna, cable headend, satellite, or other receiver are converted to pixel data and displayed on the screen. The viewer computing unit 50 runs a TV explorer application to control how the program 62 is displayed. The TV explorer application also provides a helpful user interface to assist the viewer in navigating among the channels.

As sown in FIG. 2, the TV explorer application provides a graphical user interface (UI) configured as a channel bar 64 arranged along the top periphery of the video frame. The channel bar 64 is typically hidden from view while the viewer is watching the program 62. The channel bar appears when the viewer activates buttons on one of the input devices 56–60. The channel bar 64 has multiple channel-related icons 66 which are associated the channels used to receive the programs. The icons are linearly arranged in a horizontal region or "bar." Different horizontal bars identify different groupings of icons which relate to different features. In the illustrated implementation, the channel bar 64 comprises a banner 68 and three control bars—a recent channels bar 70, a favorite channels bar 72, and a tools bar 74. The channel bar user interface is described below in more detail with reference to FIGS. 4–6.

Figure 3:
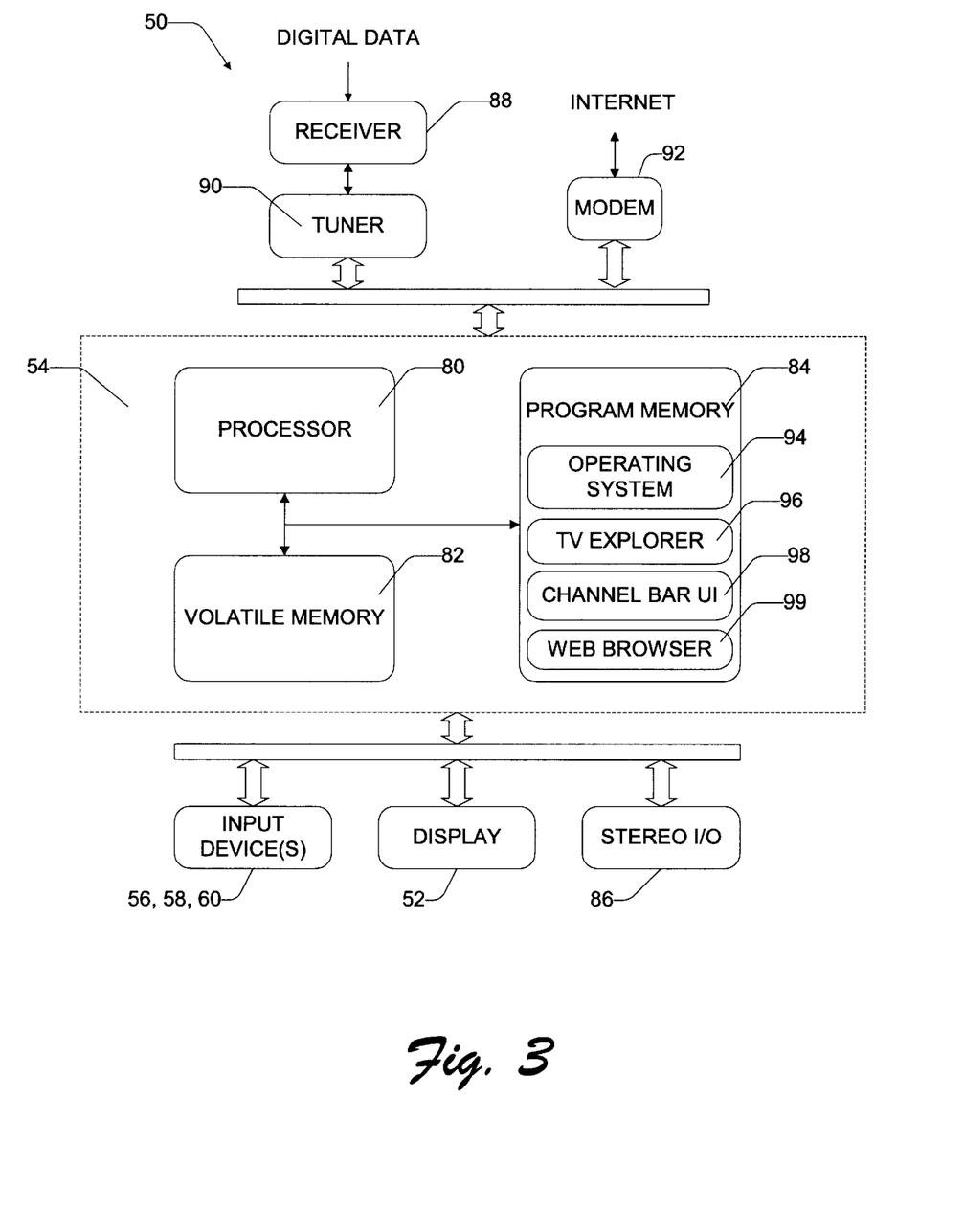
FIG. 3 is a block diagram of the viewer computing unit.

FIG. 3 shows an entertainment system in the form of a viewer computing unit 50 embodied as a broadcast-enabled computer. The central processing unit 54 has a processor 80 (e.g., x86 or Pentium® microprocessor from Intel Corporation), volatile memory 82 (e.g., RAM), and program memory 84 (e.g., ROM, Flash, disk drive, floppy disk drive, CD-ROM, etc.). The viewer computing unit 50 has one or more input devices 56–60 (e.g., keyboard, mouse, etc.), a computer display 52 (e.g., VGA, SVGA), and a stereo I/O 86 for interfacing with a stereo system.

The viewer computing unit 50 includes a digital broadcast receiver 88 (e.g., satellite dish receiver, RF receiver, microwave receiver, multicast listener, etc.) and a tuner 90 which tunes to appropriate frequencies of a wireless distribution network or addresses of a broadcast network. The tuner 90 is configured to receive digital broadcast data in a particularized format, such as MPEG-encoded digital video and audio data, as well as digital data in many different forms, including software programs and programming information in the form of data files, as well as analog video and audio data. The viewer computing unit 50 also has a modem 92 which provides dial-up access to the Internet or other data network. In other implementations of a back channel, the modem 92 might be replaced by a network card, or an RF transceiver, or other the like which provides access to the data network.

The viewer computing unit 50 runs an operating system 94 which supports multiple applications. The operating system 94 is stored in program memory 84 and is loaded into volatile memory 82 for execution on processor 80 when the entertainment system is booted. The operating system 94 is preferably a multitasking operating system which allows simultaneous execution of multiple applications. The operating system employs a graphical user interface windowing environment which presents the applications or documents in specially delineated areas of the display screen called "windows." One preferred operating system is a Windows® brand operating system sold by Microsoft Corporation, such as Windows® CE, or Windows® 95, or Windows® NT or other derivative versions of Windows®. It is noted, however, that other operating systems which provide windowing environments may be employed, such as the Macintosh operating system from Apple Computer, Inc. and the OS/2 operating system from IBM.

One example implementation of a broadcast-enabled PC is described in a co-pending U.S. patent application Ser. No. 08/503,055, entitled "Broadcast-Enabled Personal Computer," filed Jan. 29, 1996 in the names of Gabe L. Newell, Dan Newell, Steven J. Fluegel, David S. Byrne, Whitney McCleary, James O. Robarts, Brian K. Moran; William B. McCormick, T. K. Backman, Kenneth J.

Birdwell, Joseph S. Robinson, Alonzo Gariepy, Marc W. Whitman, and Larry Brader. This application is assigned to Microsoft Corporation, and is incorporated herein by reference.

The viewer computing unit 50 has a television explorer application 96 stored in memory 84 and executable on the processor 80. The TV explorer application 96 controls how the program is displayed on the display 52. For this implementation, the TV explorer application enables television-like viewing on a computer. During normal viewing, the TV explorer application 96 executes in background, with its user interface hidden from the viewer, and the television show or other video program is shown in full screen. When the viewer enters a command with an input device (e.g., channel up, channel down, entry of new channel number, etc.), the TV explorer application presents the channel bar graphical user interface on the display along with the video program. The channel bar UI is preferably implemented as a DLL (dynamic linked library) 98, which is stored in memory 84 and is callable by the TV explorer application 96. Alternatively, in systems designed more exclusively for television viewing (e.g., a Web television, TV with set top box, etc.), the channel bar UI might be implemented as part of the operating system tailored for that machine. The viewer computing unit 50 also has a Web browser 99 stored in memory 84 and executable on the processor 80 to render hypermedia documents received from target resources on the Internet.

Figure 4:
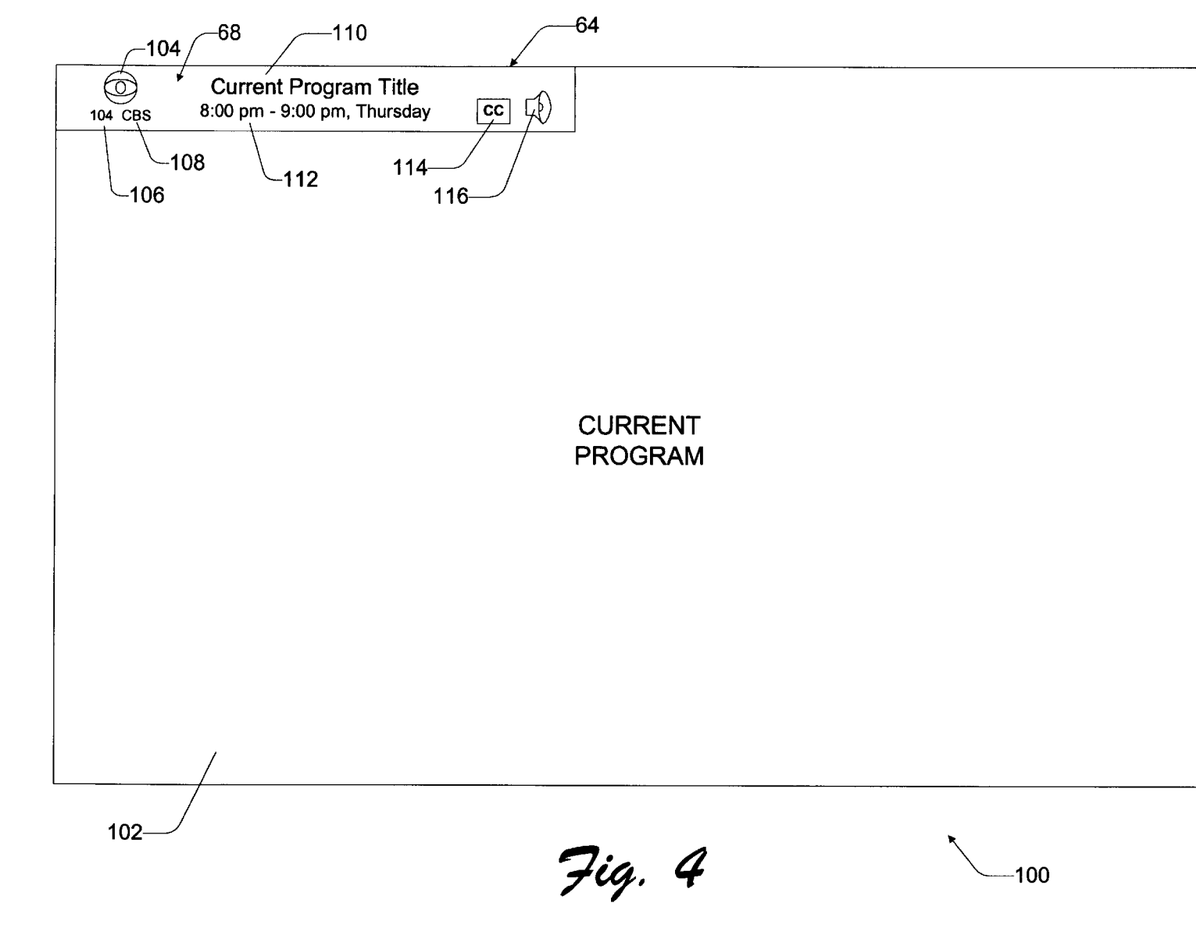
FIG. 4 is an exemplary screen illustration of a channel bar graphical user interface (UI) that is displayed when a viewer is changing channels.
Figure 5:
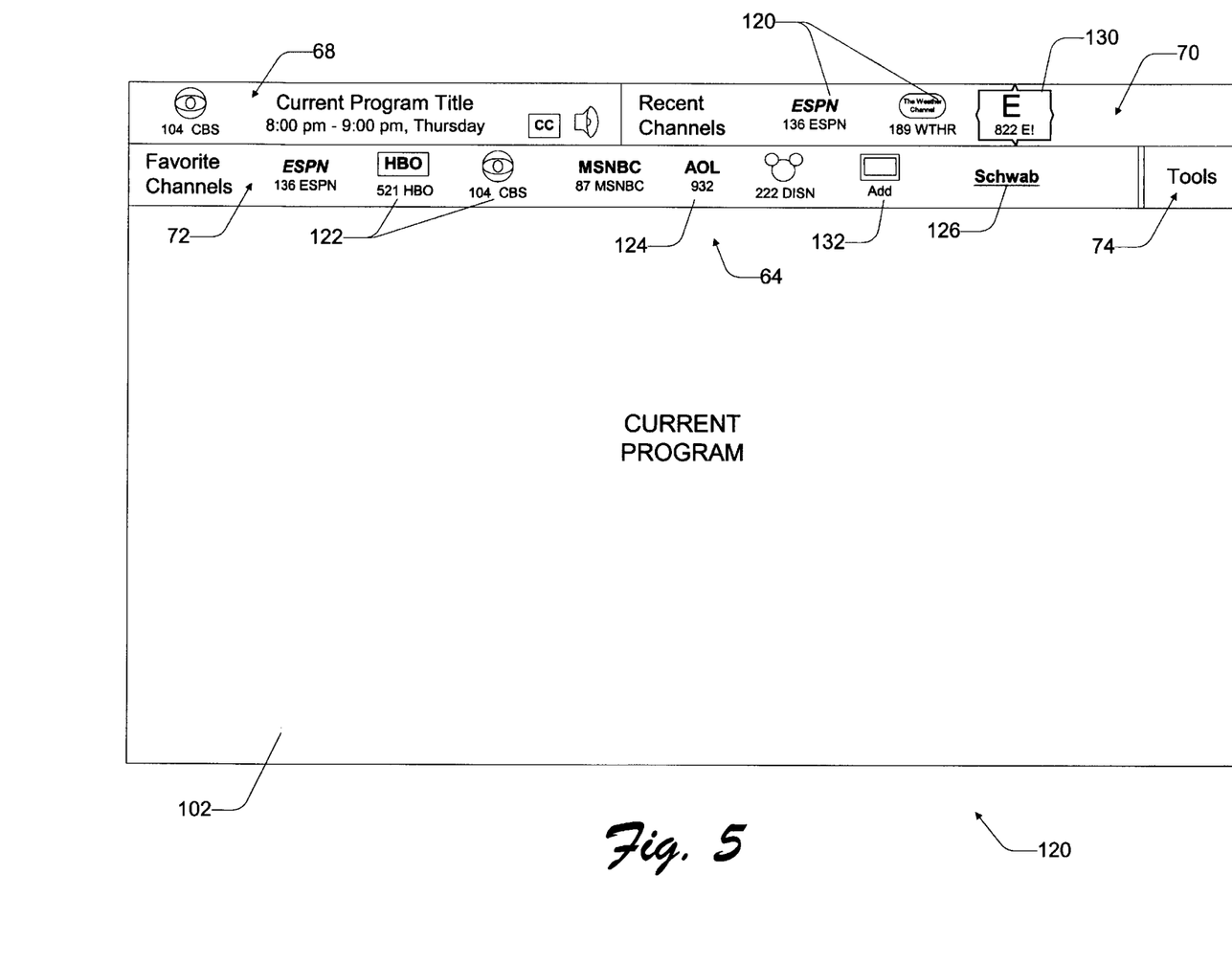
FIG. 5 is an exemplary screen illustration of the channel bar UI when the viewer requests full navigation assistance.
Figure 6:
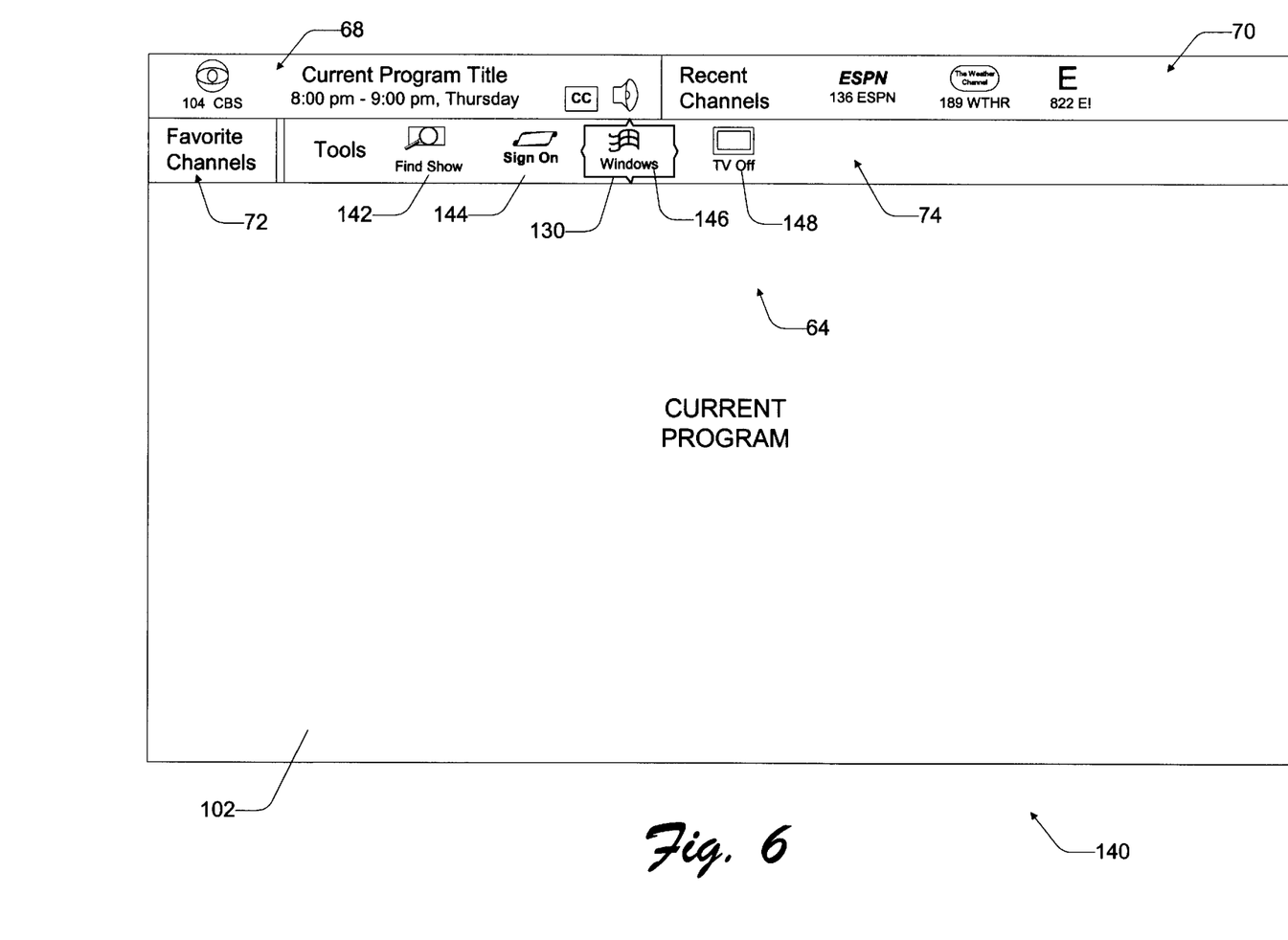
FIG. 6 is an exemplary screen illustration of the channel bar UI when the viewer invokes a tools bar portion of the UI.

FIGS. 4–6 show example display screens with various graphical constructions of the channel bar UI taken during different operating conditions. FIG. 4 shows a screen 100 when the viewer is engaged in routine channel changing (or "surfing") using channel up, channel down, or digit entry on an input device, or when using direct channel selection via an electronic programming guide (EPG). During such operation, the channel bar UI 64 presents only the banner 68 which provides information pertaining to the presently selected channel.

The banner 68 is positioned at the top, left hand corner of the video frame, partially overlaying a current program 102. The banner 68 displays information about the currently displayed program 102, such as a network or channel logo 104 (e.g., CBS "eye"), a channel number 106 (e.g., channel "104"), network or channel call letters 108 (e.g., CBS), a title of the program 110, and a program time slot 112. The banner 68 might also include information pertaining to available viewing features, as represented by the closed captioning icon 114 and the audio track icon 116. Other possible features include program rating, whether stereo or surround sound is available, whether the program is data enhanced, whether the show is a new episode or a rerun, and the like. Additionally, the banner 68 might display icons invoked by other applications, such as a mailed letter icon that is shown when the viewer receives an e-mail message.

The information used to construct the banner 68 may be supplied periodically from the content provider to the viewer computing unit and stored therein. The information might alternatively be supplied as part of the program feed; for instance, in the first ten lines of the VBI (vertical blanking interval) which is reserved for data. Another potential source of data is from an EPG application that is loaded on the viewer computing unit.

The banner 68 is updated immediately as the viewer changes the channel. In the event that the viewer enters a new channel number, digit-by-digit, using the remote control handset or keyboard, the banner 68 temporarily shows each digit as it is entered. Upon recognizing the digits entered as a channel number, or a network name, or a station's call letters, the viewer computing unit tunes to the designated channel and the banner 68 reflects the appropriate program information. The banner 68 remains visible for a predetermined time period, and is then removed following continued viewer inactivity.

FIG. 5 shows a screen 120 when the viewer specifically invokes the full channel bar UI. The viewer requests the fill channel bar UI 64 by depressing a menu key on the remote control handset, or by moving a mouse pointer to the top of the screen, or by some other designated command. The full channel bar UI 64 resides along the top of the video frame, and may partially overlie the video program 102.

According to one possible implementation, the TV explorer application presents the channel bar UI 64 and the video frame 102 within an HTML (Hypertext Markup Language) page. HTML is a subset of "SGML" (Standard Generalized Markup Language) which is a language for document representation that formalizes markup and frees it of system and processing dependencies on the language. Hypermedia content utilized by the World Wide Web (or WWW or Web) is commonly written in a "markup language" such as SGML, or more particularly HTML. With an HTML format, the TV explorer application can size the video frame to a certain dimensions, and place the channel bar 64 as a border about the video frame. In this manner, the TV explorer application ensures that the channel bar is written only in the video safe zone, and not in the underscan/overscan regions about the video safe zone.

The full channel bar UI 64 comprises the banner 68, the recent channels bar 70, the favorite channels bar 72, and the tools bar 74. The banner 68 is identical to that described above with reference to FIG. 4. The channel bar UI may be presented in one or more regions on the screen. In the illustrated implementation, the banner 68, recent channels bar 70, the favorite channels bar 72, and the tools bar 74 are arranged across the top of the screen. In an alternative configuration, the individual bars may be displayed in disjoint regions, such as placing the banner 68 at the top of the screen and having the bars 70–74 located at a different region of the screen (e.g., extending from the right side, midway down of the screen).

The recent channels bar 70 contains multiple linearly arranged, actuatable icons 120 that are associated with channels that have been most recently selected by the viewer. In this illustration, the recent channels bar 70 shows three unique channel icons related to the most recently watched channels: ESPN on channel 136, The Weather Channel on channel 189, and E! on channel 822. No channel icon is duplicated on the list, and the channel icon for the current program is not included on the list. The channel-related icons 66 are listed sequentially from most recently viewed (i.e., ESPN on channel 136) to least recently viewed (i.e., E! on channel 822). Selection of these recent channel-related icons 120 permits the viewer to quickly switch among the most recently watched channels, without requiring the viewer to remember and enter the channel or station number each time he/she wishes to switch.

The favorite channels bar 72 contains multiple, linearly arrayed, actuatable icons 122 that are associated with channels most preferred by the viewer. The favorite channels bar 72 is located beneath the banner 68 and recent channels bar 70 in a horizontal region. In this example, the favorite channels bar 72 shows six channel icons related to the viewer's most favorite channels: ESPN on channel 136, HBO on channel 521, CBS on channel 104, MSNBC on channel 87, American Online (AOL) on channel 932, and the Disney Channel on channel 222. Notice that five of these icons correspond to channels for television programs (i.e., ESPN, HBO, CBS, MSNBC, DISN) which includes traditional broadcast channels, cable channels, premiere channels, and so forth. The sixth icon, referenced as number 124, corresponds to a channel for a Web site (i.e., AOL) on the Internet.

According to an aspect of this invention, the channel bar is capable of supporting both icons for television channels, and icons for channels that deliver target specifications on a data network, such as the Internet. There is an increasing convergence between content available on traditional cable and broadcast TV and the content provided over the Internet. The number of TV- and movie-related Web sites are rapidly increasing. For instance, computer users can access a MSNBC Web site for recent news in addition to, or in lieu of, tuning their televisions to the MSNBC cable channel. As this convergence continues, the source of material will become less important or noticeable to the viewer.

In the FIG. 5 example, the AOL icon 124 indicates that the AOL Web site is available on channel 932. To the viewer, there is no differentiation among TV-related icons and Internet-related icons. This is advantageous because the viewer can use the same user interface to switch to a TV channel or to a Web site. It is noted that this Internet-related icon can be found in the recent channels bar 70 (if recently selected), and appear in the banner 68 when active.

The TV explorer application executing on the viewer computing unit 50 accommodates the various selections. When the viewer selects a TV channel icon, the viewer computing unit 50 tunes to the selected channel and begins displaying the program. When the viewer activates an Internet channel icon, the viewer computing unit 50 launches an Internet Web browser, such as the Internet Explorer from Microsoft Corporation, to load the American Online® home page. As Internet services progress and intertwine with television distribution, the AOL might actually be carried on a real channel, as opposed to a virtual channel derived for viewer interfacing.

According to another aspect of this invention, the channel bar UI 64 supports raw hyperlinks that can be displayed to the viewer. Associated with a hyperlink is an underlying target specification. The target specification is normally invisible to the user and unambiguously identifies a targeted document or resource, typically specifying the name of the computer on which the document resides and the complete file name of the document. In WWW documents, targets are specified using "universal resource locators" (URLs). A URL describes everything about a particular resource that a Web browser needs to know to request and render it. The URL describes the protocol that a browser uses to retrieve the resource, the name of the computer it is on, and the path and file name of the resource.

In this illustration, a hyperlink 126 is placed in the favorite channels bar 72. The hyperlink 126 has an associated URL "http://www.schwab.com" to a Web site for the financial services company Charles Schwab & Co. The "http://" portion of the URL describes the protocol, with the letters "http" standing for HyperText Transfer Protocol, a set of rules that a browser follows to request a document and a remote server follows to supply the document. The "www.schab.com" portion of the URL is the name of the remote host computer which maintains the Schwab Web site. When the viewer activates the hyperlink "Schwab," the viewer computing unit 50 launches the Web browser 99 to render the target resource addressed by the URL. The hypertext document is retrieved over the Internet via the modem and supplied to the viewer computing unit.

Hypertext usage is not limited to the Internet. The target resources referenced by the hyperlinks might alternatively be located locally. For instance, the system might pre-cache supplemental information about certain shows before they air based on predictive viewing tendencies, or as part of a promotional data broadcast advertising the show. Additionally, various multimedia applications utilize hypertext to allow users to navigate through different pieces of information content. For instance, an encyclopedia program might use hyperlinks to provide cross-references to related articles within an electronic encyclopedia. The same program might also use hyperlinks to specify remote information resources such as WWW documents located on different computers.

In concept, the target of a hyperlink can be virtually any type of object—including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered.

According to another aspect of this invention, the channel bar may contain one or more icons (not shown) to peripheral media devices, such as a video cassette recorder (VCR) or a digital video disk (DVD) player. Typically, these devices can be mapped to unused channels. The channel bar UI can then assign icons representative of the VCR or DVD player which, upon activation, tune the viewing unit to the channel associated with the VCR or DVD player. The VCR or DVD icons are treated as other channel-related icons, and can appear in the recent channels bar 70 or the favorite channels bar 72.

A focus 130 is movable along the channel bar 64 (and in this illustration, the recent channels bar 70) to highlight different icons. The focus 130 is shown as a frame that borders the selected icon. The focus may be implemented in a number of ways, such as changing the icon color when selected, displaying an animated rectangle around the icon, or visually elevating a selected icon to appear more in the foreground, enlarging a selected icon, and the like. Additionally, the focus might be implemented as a pointer, such as those commonly used in personal computers. Still another possible implementation of the focus 130 is that of a tip pointer, in which a pointer identifies an icon and a text box is currently displayed adjacent to the pointer to offer a description of the icon being referenced by the pointer. Such a text box may contain dynamically changing information about the icon; for example, if a favorite channel icon is selected, the text box may display the name of the program currently showing on that channel.

The viewer moves the focus 130 along the channel bar 64 using one of the input devices (e.g., actuating the directional pad or keys on a remote control handset, depressing the arrow keys on a keyboard, or manipulating the mouse). The focus can be configured to slide icon-by-icon, or to permit free selection of any icon without regard to positional order, such as by using a mouse pointer or the like. Once the focus is positioned on a selected icon, the icon is activated by clicking a mouse key, or hitting the enter key on the keyboard, or depressing an action key on the remote control handset, or the like.

The channels represented in the favorite channels bar 72 are initially set at the time of sale. For instance, the manufacturer or retailer might set the favorites list to a set of predetermined channels for the corresponding television market. Alternately, the channels may be set based on selections (involving demographic information, genre preferences, and the like) made by the viewer during an initial configuration phase. After purchase, the viewer can reconfigure the channels through a simple menu interface which allows the viewer to add or remove icons. In the FIG. 5 illustration, an add icon 132 is provided as part of the favorite channels bar 72 to facilitate adding a new channel. When the viewer is watching a favorite channel (i.e., a Web site, premium channel, or regular channel), the viewer activates the add icon 132 and the viewer computing unit immediately creates an icon representing the currently displayed channel. This icon then becomes a part of the favorite channels bar 72 and provides a short cut back to the channel at any time. If space in the favorite channels bar is limited, the least favorite channel icon may be removed with the addition of a new favorites icon.

As an alternative, the icons listed in the favorites channels bar 72 might be developed based on viewer usage patterns. For example, the viewer computing unit 50 might automatically monitor "hits" on each channel and list in priority the icons associated with the channels accumulating the highest number of hits. Other heuristics may be used.

It is noted that the channel-related icons 120 and 122 displayed in the recent channels bar 70 and the favorite channels bar 72 are formed of three elements: a network or channel logo (e.g., CBS "eye"), a channel number (e.g., channel "104"), and network or channel call letters (e.g., CBS). In other implementations, the icons may be implemented with only one or two of these elements. Furthermore, an icon might be a different symbol created by the viewer which represents a particular channel, such as a "football" icon to represent ESPN or a "snowflake" icon to represent the Weather Channel. Essentially, a channel related icon can be any symbol, word, number, or combination, which is associated with a particular channel.

With reference again to FIG. 5, the tools bar 74 is shown in a collapsed state to conserve precious screen space in the channel bar region. When the viewer activates this small region, the tools bar 74 expands across the favorite channels bar 72 to reveal the icons in the tools bar.

FIG. 6 shows a screen 140 with the tools bar 74 expanded to a full bar state. The tools bar 74 contains actuatable icons 142–148 which control operation of the viewer computing unit 50. In this example, the tools bar 74 lists a "Find Show" icon 142, a "Sign On" icon 144, a "Windows" icon 146, and a "TV off" icon 148. The "Find Show" icon 142 launches a find dialog box which permits a viewer to enter letters or numbers in search of a channel, a program, a network, a particular subject matter, or the like. The "Sign On" icon 144 enables viewers to initially log onto the entertainment system. This icon is activated when a viewer first turns on the system and involves a password or key challenge to restrict viewing to authorized viewers. Additionally, requiring viewer identification through log on procedures enables different viewer permission levels, such as restricting junior family members from viewing certain channels. The "TV off" icon 148 initiates a shut down sequence to terminate operation of the computer viewing unit.

The "Windows" icon 146 allows a viewer to transition between a full screen mode of operation and windows mode of operation. During normal viewing, the television signals are displayed within a full screen frame. The channel bar, when visible, is overlaid along the top periphery of the frame. When the viewer activates the "Windows" icon 146, the TV explorer application becomes a windowed application on the screen with the television signals and channel bar being constrained within a graphical window.

Figure 7:
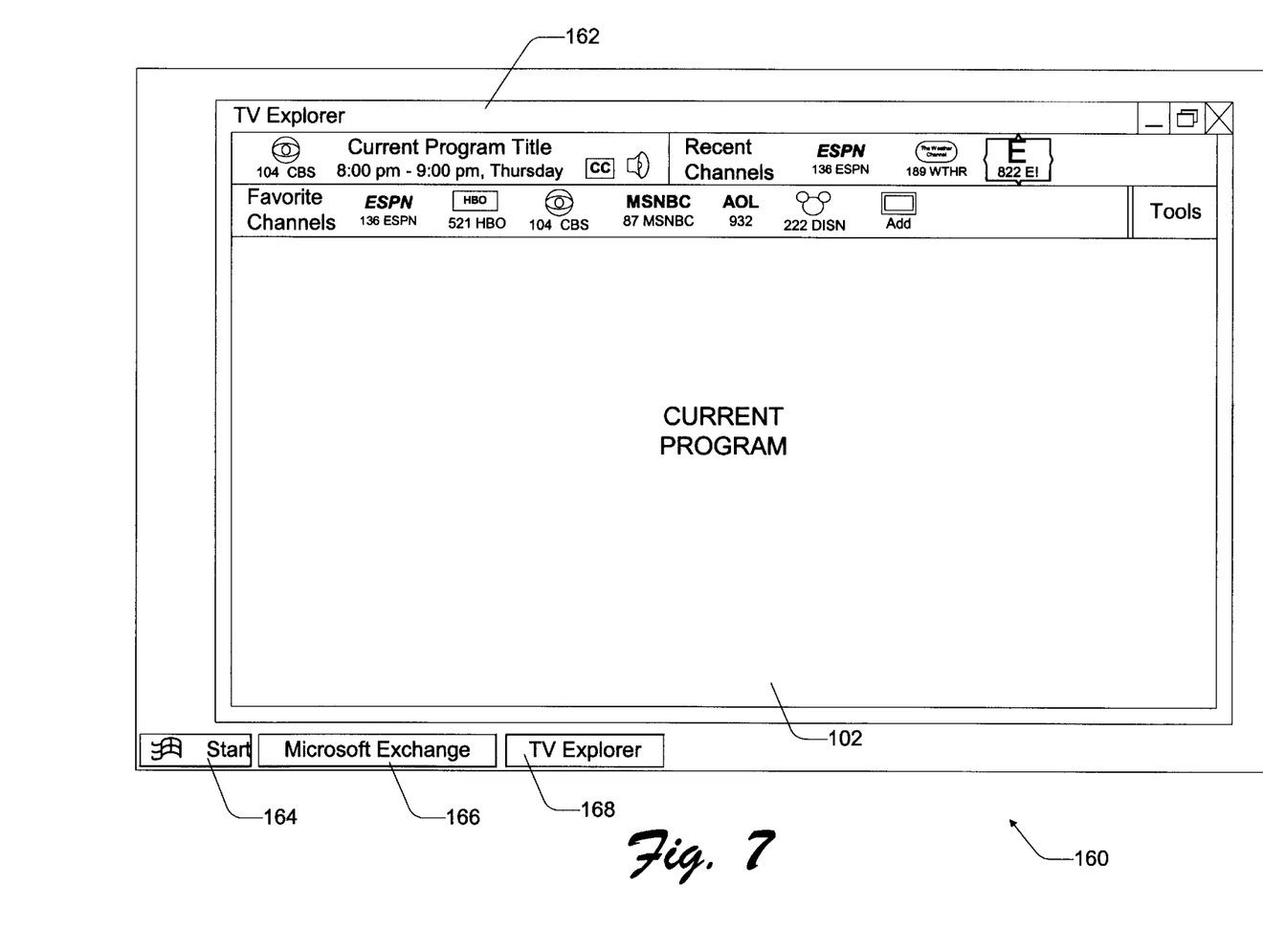
FIG. 7 is an exemplary screen illustration showing a windows mode of operation.

FIG. 7 shows a screen 160 during the windows mode of operation. Here, the traditional television screen is converted to a computer-like screen in which the TV explorer application is constrained within an active window 162. The display screen takes on a look and feel of a user interface common to computers users with Windows® operating systems. The "Start" menu button 164 and other soft buttons 166 and 168 to active programs are displayed along the bottom task bar. In this mode, the viewer can use the viewer computing unit as a conventional personal computer to launch other applications, such as e-mail, word processing, spreadsheet applications, or games. The TV explorer application is itself a Windowed program which can be minimized, resized, and reshaped according to the viewer's likes, while maintaining a standard television aspect ratio of four units horizontal to three units vertical, or 16 units horizontal to nine units vertical, in the case of "letterbox" television viewing.

The invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. In an entertainment system capable of receiving video signals from multiple channels and displaying the video signals on a display within a video frame, a user interface comprising a graphical channel bar which contains a plurality of linearly arranged channel-related icons for navigating the channels and a recent channels bar which contains actuatable icons associated with channels that have been most recently selected, the channel bar and the recent channels bar being concurrently presented on the display along with the video frame when the UI is invoked so that a viewer can select and actuate one of the icons on the channel bar or on the recent channels bar to cause the entertainment system to tune to a particular channel related to the actuated icon.

2. A user interface as recited in claim 1, wherein the channel bar and the recent channels bar are presented as one or more regions on the display and are one of (1) all regions of the channel bar and the recent channels bar are situated outside of the video frame, (2) some regions of the channel bar and the recent channels bar are situated outside of the video frame while other regions of the channel bar and the recent channels bar are overlaid on a portion of the video frame, or (3) all regions of the channel bar and the recent channels bar are overlaid on a portion of the video frame.

3. A user interface as recited in claim 1, wherein the channel bar comprises a banner to identify which channel is presently selected.

4. A user interface as recited in claim 3, wherein the banner contains indicia selected from a group of indicia comprising a network logo, channel number, call letters, a title of a program carried on the present channel, a program time slot, whether the program supports closed captioning, audio track data, program rating, whether the program supports stereo or surround sound, whether the program is data enhanced, whether the show is a new episode or a rerun, and icons invoked by other applications.

5. A user interface as recited in claim 1, wherein the channel bar comprises a favorite channels bar which contains actuatable icons associated with channels that are preferred by a viewer so that the viewer can actuate one of the icons on the favorite channels bar to jump to the associated channel.

6. A user interface as recited in claim 1, wherein the channel bar comprises a tools bar which contains actuatable icons for controlling operation of the entertainment device.

7. A user interface as recited in claim 1, wherein the icons on the channel bar correspond to channels for television programs and to channels for target specifications on a data network.

8. A user interface as recited in claim 1, wherein at least one icon on the channel bar corresponds to a channel designated for playing a peripheral media device.

9. A user interface as recited in claim 1, wherein the channel bar contains one or more hyperlinks to an executable program.

10. A user interface as recited in claim 1, wherein the channel bar contains one or more hyperlinks to target resources.

11. A user interface as recited in claim 1, wherein the channel bar comprises:
a banner to identify which channel is presently selected;
a favorite channels bar which contains actuatable icons associated with channels that are preferred by a viewer; and
a tools bar which contains actuatable icons for controlling operation of the entertainment device.

12. A user interface as recited in claim 11, wherein the banner and recent channels bar are positioned side-by-side on a first horizontal level and the favorite channels bar is positioned beneath the banner and recent channels bar in a second horizontal level.

13. A user interface as recited in claim 11, wherein the banner is positioned on one region of the screen and the recent channels bar, the favorites channels bar, and the tools bar are positioned in a different region of the screen.

14. A user interface as recited in claim 11, wherein the banner, the recent channels bar, the favorites channels bar, and the tools bar are positionable in different regions of the screen.

15. A user interface as recited in claim 11, wherein one of the recent channels bar, the favorite channels bar, or the tools bar are alternately collapsible and expandable to conserve space in the channel bar.

16. A user interface as recited in claim 1, further comprising a focus which is movable along the channel bar and the recent channels bar for selection and actuation of individual ones of the icons.

17. A computer-readable medium which stores an operating system having computer-executable instructions for operating an entertainment device, the operating system incorporating the channel bar UI as recited in claim 1.

18. In an entertainment system capable of receiving video signals from multiple channels and displaying the video signals on a display within a video frame, the entertainment device having a processor which executes an invokable channel bar user interface (UI), the channel bar UI comprising:
a banner to identify which channel is presently selected; and
at least one control bar which contains a plurality of linearly arranged channel-related icons for navigating the channels, the control bar further having a recent channels bar which contains actuatable icons associated with channels that have been most recently selected.

19. A channel bar UI as recited in claim 18, wherein the control bar comprises a favorite channels bar which contains actuatable icons associated with channels that are preferred by a viewer.

20. A channel bar UI as recited in claim 19, further comprising means for enabling a viewer to select which channels appear in the favorite channels bar.

21. A channel bar UI as recited in claim 19, further comprising means for automatically choosing one or more channels for the favorite channels bar based on viewer viewing patterns.

22. A channel bar UI as recited in claim 18, wherein the control bar comprises a tools bar which contains actuatable icons for controlling operation of the entertainment device.

23. A computer-readable medium which stores an operating system having computer-executable instructions for operating an entertainment device, the operating system incorporating the channel bar UI as recited in claim 18.

24. In an entertainment system capable of receiving television signals and displaying the television signals within a display frame on a display, and in which the entertainment system has a memory, a processor, and an operating system executing on the processor to provide a graphical user interface environment which supports presentation of at least one graphical window on the display, a computer-executable application stored in the memory and executable on the processor to control presentation of the television signals on the display, the computer-executable application containing computer-executable instructions for:
displaying the television signals within the display frame during a first mode of operation;
displaying the television signals within a graphical window during a second mode of operation; and
displaying a channel bar along with the television signals, the channel bar having a plurality of linearly arranged channel-related icons which, upon actuation, cause the entertainment system to change channels to receive different television signals, the channel bar further having a windows icon which, upon actuation, converts between the first and second mode of operation;
displaying, within the channel bar, actuatable hyperlinks to target resources on a data network.

25. The computer-executable application as recited in claim 24, further comprising computer-executable instructions for performing the step of restricting the sizing of the graphical window in the second mode of operation to maintain a predefined aspect ratio.

26. The computer-executable application as recited in claim 24, further comprising computer-executable instructions for performing the step of sizing the channel bar for depiction within one of the display frame or the graphical window.

27. The computer-executable application as recited in claim 24, further comprising computer-executable instructions for alternately collapsing and expanding the channel bar after a viewer selects an icon.

28. In an entertainment system which can receive television programs from multiple channels, a method for operating the entertainment system comprising the following steps:
displaying a television program from one of the channels; and selectively displaying a channel bar and a recent channels bar in conjunction with the television program, the channel bar having a plurality of linearly arranged channel-related icons which are associated with other channels and the recent channels bar containing actuatable icons associated with channels that have been most recently selected.

29. A method as recited in claim 28, further comprising the step of alternately collapsing and expanding the channel bar after a viewer selects an icon.

30. A method as recited in claim 28, further comprising the step of displaying a focus which is movable along the channel bar for selection and actuation of individual ones of the icons.

31. A method as recited in claim 28, further comprising the step of displaying hyperlinks to target resources on a data network as part of the channel bar.

32. A method as recited in claim 28, further comprising the step of displaying TV-channel icons which are associated with channels carrying the television programs and non-TV-channel icons which are associated with channels that do not carry television programs.

33. A viewer computing unit programmed to perform the steps recited in claim 28.

34. A computer readable medium which directs a computer to perform the steps recited in claim 28.

35. A viewer computing unit for depicting television programs on a display, comprising:

a processor;

an operating system executing on the processor to provide a graphical user interface environment which supports presentation of at least one graphical window on the display;

a television explorer application executable on the processor to provide a user interface helpful to a viewer to select among channels carrying the television programs, the user interface (UI) being configured as a channel bar having a plurality of channel-related icons which are associated with the channels, the television explorer application facilitating conversion between a full screen mode in which a television program is displayed in full screen on the display and a windows mode in which the television program is displayed within a graphical window according to a predefined aspect ratio; and an input device operable in conjunction with the operating system to enable a viewer to select one of the icons on the channel bar.

36. A viewer computing unit as recited in claim 35, wherein the channel bar comprises a banner to identify which channel is presently selected.

37. A viewer computing unit as recited in claim 35, wherein the channel bar comprises a favorite channels bar which contains actuatable icons associated with channels that are preferred by a viewer so that the viewer can actuate one of the icons on the favorite channels bar to jump to the associated channel.

38. A viewer computing unit as recited in claim 35, wherein the channel bar comprises a recent channels bar which contains actuatable icons associated with channels that have been most recently selected so that a viewer can actuate one of the icons on the recent channels bar to jump to the associated channel.

39. A viewer computing unit as recited in claim 35, wherein the channel bar comprises a tools bar which contains actuatable icons for controlling operation of the entertainment device.

40. A viewer computing unit as recited in claim 35, wherein the icons on the channel bar correspond to channels for television programs and to channels for target specifications on a data network.

41. A viewer computing unit as recited in claim 35, wherein the channel bar contains one or more hyperlinks to target resources.

* * * * *

UNITED STATES PATENT AND TRADEMARK OFFICE
CERTIFICATE OF CORRECTION

PATENT NO : 6,141,003
DATED : Oct. 31, 2000
INVENTOR(S) : Ives Chor et al.

It is certified that error appears in the above-identified patent and that said Letters Patent are hereby corrected as shown below:

Column 3, line 45, change "arc" to --are--.

Column 6, line 9, change "fill" to --full--.

Column 7, line 37, change "American" to --America--.

Column 7, line 66, change www.schab.com to --www.schwab.com--.

Signed and Sealed this

Twenty-ninth Day of May, 2001

NICHOLAS P. GODICI

Attest:

Attesting Officer

Acting Director of the United States Patent and Trademark Office